United States Patent [19]

Barlow et al.

[11] Patent Number: 4,770,902

[45] Date of Patent: Sep. 13, 1988

[54] METHOD FOR COVERING AN ELECTRICAL CONDUCTING MEANS

[75] Inventors: Anthony Barlow; Melvin F. Maringer, both of Cincinnati, Ohio; Fred K. Morgan, Cold Springs, Ky.

[73] Assignee: National Distillers and Chemical Corporation, Cincinnati, Ohio

[21] Appl. No.: 789,591

[22] Filed: Oct. 21, 1985

Related U.S. Application Data

[60] Continuation-in-part of Ser. No. 497,313, May 23, 1983, Pat. No. 4,548,969, and Ser. No. 719,398, Apr. 3, 1985, Pat. No. 4,555,379, which is a division of Ser. No. 497,313.

[51] Int. Cl.$^4$ .............................................. B05D 5/12
[52] U.S. Cl. .................................... 427/117; 524/529; 524/535; 525/275
[58] Field of Search .................. 427/117; 525/275; 524/529, 535

[56] References Cited

U.S. PATENT DOCUMENTS

| | | | |
|---|---|---|---|
| 3,802,913 | 4/1974 | MacKenzie, Jr. | 427/120 |
| 3,876,613 | 4/1975 | Needham et al. | 524/307 |
| 3,901,863 | 8/1975 | Berger et al. | 526/114 |
| 4,018,852 | 4/1977 | Schober | 427/117 |
| 4,024,729 | 6/1977 | Rees et al. | 526/228 |
| 4,134,812 | 1/1979 | Sasaki et al. | 427/117 |
| 4,259,410 | 3/1981 | Dittmann et al. | 427/117 |
| 4,260,661 | 4/1981 | Walters et al. | 427/117 |
| 4,326,988 | 4/1982 | Welch et al. | 526/114 |
| 4,328,121 | 5/1982 | Lapshew | 526/124 |
| 4,394,291 | 7/1983 | Hawley | 526/119 |

Primary Examiner—Joseph L. Schofer
Assistant Examiner—Bernard Lipman
Attorney, Agent, or Firm—Kenneth D. Tremain

[57] ABSTRACT

A method for covering electrical conducting means is disclosed. In this method an ethylene polymer composition comprising a linear ethylene polymer having a density of at least 0.94 and a crosslinking effective amount of an acetylenic diperoxide compound having a one hour half-life decomposition temperature of more than 135° C. is utilized to cover the electrical conducting means.

19 Claims, No Drawings

METHOD FOR COVERING AN ELECTRICAL CONDUCTING MEANS

REFERENCE TO RELATED APPLICATIONS

The present application is a continuation-in-part of U.S. patent application Ser. No. 497,313, filed May 23, 1983, now U.S. Pat. No. 4,548,969 and U.S. patent application Ser. No. 719,398, filed Apr. 3, 1985, U.S. Pat. No. 4,555,379 which is a divisional application of said U.S. patent application Ser. No. 497,313, now U.S. Pat. No. 4,548,969.

BACKGROUND OF THE DISCLOSURE

1. Field of the Invention

The present invention is directed to an electrical insulating covering composition for an electrical cable. More particularly, the present invention is directed to a method for covering electrical conducting means wherein said means are covered with a crosslinked ethylene polymer composition.

2. Background of the Prior Art

The use of polymeric compositions as insulating materials for electrical conducting wires and cables is well known. Those skilled in the art are aware that ethylene polymers, especially polyethylene (PE), are particularly preferred in this application. Thus, the art is replete with patents directed to polyethylene cable coatings, wraps and the like. Many PE compositions have been devised to provide various desirable properties particularly designed for this application.

Only recently has there been a significant increase in the trend toward disposing electrical wires, cables and the like underground. Underground wiring eliminates service interruptions in inclement weather caused by felled trees, debris and the like which severs overhead power lines.

Although underground cabling has obvious advantages, it places more severe service requirements upon cable coverings. As those skilled in the art are aware, cables disposed underground are subject to serious abrasion in installation. That is, cables are oftentimes disposed underground in cement or concrete conduits. The coated wires are moved along these conduits, subjecting the cable coatings to abrasion. As a result, cable coatings must not only provide the properties usually associated with coatings for electrically conducting conduits, that is, electrical resistance, flame resistance, resistance to stress cracking and the like but, in addition, abrasion resistance.

Those skilled in the art are aware that for a given molecular weight the abrasion resistance of ethylene polymers is generally proportional to their density. Conversely, at a given density, abrasion resistance of an ethylene polymer is proportional to molecular weight. Thus, the more dense an ethylene polymer the greater the degree of its resistance to abrasion. However, because of the higher melting point of high density ethylene polymers, particularly polyethylene, the more difficult it is to effectuate crosslinkage thereof. This is because the usual crosslinking agents decompose at relatively low temperatures. Unfortunately, the higher the density the higher the temperature required to blend the ethylene polymer with crosslinking agents. Thus, in the past it was not possible to utilize a sufficiently high density ethylene polymer, satisfactory to provide adequate abrasion resistance because such an ethylene polymer could not be crosslinked.

Those skilled in the art are aware that many of the properties, other than abrasion resistance, of an ethylene polymer employed as a cable wrap require that the polymer be crosslinked. Thus, a dilemma in the art arises when an attempt is made to provide a polyethylene or other ethylene polymer cable covering with acceptable abrasion resistance while maintaining other acceptable properties.

U.S. Pat. No. 2,528,523 discloses a process for crosslinking polyethylene to produce a polymer particularly applicable to wire coating. In this process a tertiary peroxide is blended with polyethylene at a temperature of 110° to 180° C. It is noted that the patentee excludes those tertiary peroxides which possess unsaturated linkages or which contain aromatic radicals.

U.S. Pat. No. 3,649,441 sets forth an electrical conductor jacketing material submitted to possess improved thermal and environmental stress resistance as well as abrasion resistance. The material providing these improved properties is a blend of high density polyethylene and a block copolymer of polyethylene and poly(butene-1). Neither of these two blended polymers are crosslinked.

SUMMARY OF THE INVENTION

It has now been discovered that high density ethylene polymers can be successfully crosslinked providing abrasion resistance in excess of that imparted by the linear high density ethylene polymers of the prior art while at the same time providing electrical resistance properties necessary for underground cable coatings.

In accordance with the instant invention a method for shielding an electrical conducting means comprising covering an electrical conducting means with an ethylene polymer composition, said composition including a linear ethylene polymer having a density of at least about 0.94 and a crosslinking effective amount of an acetylenic diperoxide compound having a one hour half-life decomposition temperature of more than 135° C.

DETAILED DESCRIPTION

A method has been found for shielding electrical conducting means, especially electrical distribution cable, which comprises covering the electrical conducting means with a crosslinked ethylene polymer composition. The ethylene polymer composition includes a linear ethylene polymer having a density of at least about 0.94 grams per cubic centimeter (g/cc) and an acetylenic diperoxide compound having a one hour half-life decomposition temperature of greater than 135° C.

The linear ethylene polymer, in a preferred embodiment, is polyethylene. Other preferred embodiments of the ethylene polymer of the present invention includes copolymers of ethylene and a higher alpha-olefin. More preferably, in the preferred embodiment wherein the ethylene polymer is an ethylene copolymer, the copolymer comprises at least 90 weight percent ethylene and the remainder an alpha olefin having 3 to 8 carbon atoms. A particularly preferred alpha-olefin, present with at least 90 weight percent ethylene, is butene-1.

The second component, in the composition, useful in covering electrical cable and the like, a crosslinking effective amount of an acetylenic diperoxide compound having a one hour half-life decomposition temperature of more than 135° C., is, more preferably, a crosslinking effective amount of a diperoxy compound selected from the group consisting of hexynes having the formula

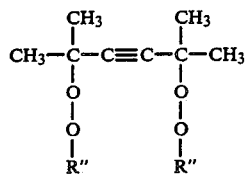

octynes having the formula

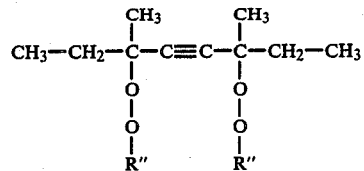

and octynes having the formula

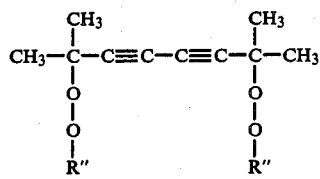

where R" is selected from the group consisting of tertiary alkyl, alkyl carbonate and benzoate.

The crosslinking agents discussed above, the acetylenic high molecular weight diperoxy hexynes and octynes are disclosed in U.S. Pat. No. 3,214,422, the entire contents of which are incorporated herein by reference. Of the diperoxy hexynes and octynes within the contemplation of the present invention, 2,5-dimethyl-2,5-di(t-butylperoxy)hexyne-3 is particularly preferred.

In a preferred embodiment of the present invention the composition includes a monomeric crosslinking coagent. A preferred such coagent is triallyl cyanurate.

In a further preferred embodiment of the present invention, an ultraviolet (UV) inhibitor is provided. Of the UV inhibitors within the contemplation of the present invention, carbon black is particularly preferred. Such an additive significantly improves the useful life of the polymer composition when used as an underground cable covering.

Another preferred additive useful in the composition of the present invention, used as a cable covering, is a color additive or pigment to impart a desired color to the polymer composition. This is important, again in the preferred embodiment wherein the polymer composition is used as cable covering, to identify and distinguish cables.

A still further preferred embodiment of the composition of the present invention utilizes a flame retardant additive. Those skilled in the art are aware that it is important to insure against cable fires. Among the preferred fire retardant additives useful in the composition of this invention are organic, heat-labile chlorine or bromine compounds. For example, polychlorinated paraffins, COD-dihex (the reaction product of hexachlorocyclopentadiene and 1,5-cyclooctadiene), decabromodiphenyl oxide, pentabromochloro-cyclohexane, ethylene bis-tetrabromophthalimide, hexabromocyclodo-decane, 2,3,4,5,6-pentabromoethylbenzene, 1,2,3,4,5,6,7,8,9,-10,11-dodecachloro-1,4,4a,5a,6,9-,9a,9b- octahydro-1,4,6,9-di-methanodibenzofuran and 1,2-bis-(2,4,6-tribromophenoxy)ethane. Optionally, and preferably, antimony trioxide is employed with any of the organic chlorine or bromine containing fire retardant compound recited above to provide a synergistic flame retardant combination.

In preferred embodiments of the present invention not only does the cable coating composition include a linear ethylene polymer, the crosslinking diperoxide agent, one or more optional of the above-recited ingredients: an UV inhibitor, color additive and a flame retardant additive composition but also other adjuvant materials which are commonly employed in olefin extruded compositions. For example, the composition may include heat stabilizers, light stabilizers, lead stabilizers, plasticizers, fillers, processing aids, lubricants, slip agents, modifiers and similar materials.

The following examples are given to illustrate the instant invention. Because these examples are given for illustrative purposes only the invention should not be limited thereto.

EXAMPLE 1

A sample of 100 parts by weight of a thermoplastic polyethylene, having a density of 0.955 (g/cc), was blended with 1 part by weight of 2,5-dimethyl-2,5-di(t-butylperoxy)-hexyne-3. In addition, 0.5 part by weight of the monomeric crosslinking coagent triallyl cyanurate was included in the blend. The components were blended at a temperature of approximately 120° C.

The blended mixture was pressure cured under elevated pressure and a temperature of about 205° C. for six to seven minutes to form one-quarter inch thick crosslinked slabs. The slabs were cut into 1 square inch test specimens. The specimens were tested in triplicate to determine the abrasion resistance of the composition.

In this test each test specimen was abraded using an NBS [trademark] abrader. Each test specimen was first given a 500 cycle break-in to allow the specimens to conform to the abrasion drum shape. Upon completion of the 500 cycle break-in, each test specimen was weighed. Thereafter, the test specimens were subjected to 1500 cycles of abrasion. However, abrasion was interrupted at 500 and 1000 cycles. At these points, as well as after 1500 cycles, the specimens were weighed to determine weight loss at 500, 1,000 and 1,500 cycles. The weight loss was reported in terms of grams per square inch of specimen surface.

The above description of the abrasion test conforms in general to the procedure enumerated in ASTM Standard Test Method D-1630 for rubber property-abrasion resistance. As in that test procedure, an 80 grit abrasive was employed. It is noted that the ASTM test procedure differs from the above described procedure in that the present procedure employs weight change whereas the ASTM version of the test employs thickness measurements. It is believed weight loss represents a more objective method of measuring loss due to abrasion than does reporting thickness loss.

Table 1 summarizes the constituency of the composition of this example. Table 2 tabulates the amounts of the constituents of the composition. Table 3 provides the abrasion test results.

EXAMPLE 2

Example 1 was repeated except that the linear polyethylene having a density of 0.955, was replaced with a linear polyethylene of density of 0.951. Again, the results of this example are tabulated in Tables 1, 2 and 3.

EXAMPLE 3

A crosslinked polymer was formed by blending 100 parts by weight of polyethylene having a density of 0.955 crosslinked with 1.78 parts of 2,5-dimethyl-2,5-di(t-butylperoxy)-hexyne-3. The crosslinking occurred in the presence of 0.45 part of triallyl cyanurate. The polymer was additionally blended with 1 part by weight of a heat stabilizer, 2.1 parts by weight of a processing aid and 3.06 parts by weight of carbon black to form a cable covering composition.

This composition was tested for abrasion resistance in accordance with the procedure set forth in Example 1. Thus, 1 square inch by ¼ inch thick specimens were prepared and tested as described in Example 1.

Again the composition of this example is tabulated in Tables 1 and 2. The results of this example are included in Table 3.

COMPARATIVE EXAMPLE 1

Example 1 was again repeated. However, instead of the linear polyethylene of that example, a polyethylene having a density of 0.920 was employed. A heat stabilizer in a concentration of 1.05 parts by weight was provided. In addition, instead of a peroxide within the contemplation of the present invention, dicumyl peroxide, an organic peroxide outside the scope of the present invention, was utilized. Further, because of the relatively low density of the polyethylene crosslinked by dicumyl peroxide, no crosslinking coagent was necessary and thus one was not employed. Those skilled in the art are aware that polyethylene having a density of 0.920 readily crosslinks in the presence of dicumyl peroxide without the necessity of a crosslinking coagent.

The composition and results of this example appear in Tables 1, 2 and 3.

COMPARATIVE EXAMPLES 2-4

The polyethylenes of Examples 1, 2 and Comparative Example 1, having a density of 0.955, 0.951 and 0.920, respectively, were formed into 1 square inch test specimens. Thus, the polyethylene test specimens were not crosslinked. These linear polyethylene specimens were abrasion tested in accordance with the procedure of Example 1. Tables 1 and 2 summarizes the constituency of the polyethylene samples and Table 3 provides the results of the abrasion test.

TABLE 1

| Example No. | Polyethylene Density, g/cc | Peroxide | Crosslinking Coagent | Other Ingredients |
| --- | --- | --- | --- | --- |
| 1 | 0.955 | a | c | None |
| 2 | 0.951 | a | c | None |
| 3 | 0.955 | a | c | d, e, f |
| CE1 | 0.920 | b | None | d |
| CE2 | 0.955 | None | None | None |
| CE3 | 0.951 | None | None | None |
| CE4 | 0.920 | None | None | None |

NOTES
a — 2,5-dimethyl-2,5-di(t-butylperoxy)hexyne-3
b — dicumyl peroxide
c — triallyl cyanurate
d — heat stabilizer
e — carbon black
f — processing aid

TABLE 2

| Example No. | Composition, Parts by Weight | | | | | |
| --- | --- | --- | --- | --- | --- | --- |
| | PE | Peroxide | Coagent | Stabilizer | Process. Aid | Carbon Black |
| 1 | 100 | 1 | 0.5 | — | — | — |
| 2 | 100 | 1 | 0.5 | — | — | — |
| 3 | 100 | 1.78 | 0.4 | 1 | 2.1 | 3.06 |
| CE1 | 100 | 1.75 | — | 1.05 | — | — |
| CE2 | 100 | — | — | — | — | — |
| CE3 | 100 | — | — | — | — | — |
| CE4 | 100 | — | — | — | — | — |

TABLE 3

| Example No. | Abrasion Wt. Loss, gm/sq inch | | |
| --- | --- | --- | --- |
| | After 500 Cycles | After 1,000 Cycles | After 1,500 Cycles |
| 1 | 0.092 | 0.183 | 0.268 |
| 2 | 0.114 | 0.208 | 0.294 |
| 3 | 0.071 | 0.132 | 0.189 |
| CE1 | 0.139 | 0.262 | 0.379 |
| CE2 | 0.138 | 0.259 | 0.383 |
| CE3 | 0.153 | 0.312 | 0.474 |
| CE4 | 0.217 | 0.430 | 0.647 |

EXAMPLE 4

Plaques of crosslinked polyethylene made in accordance with Example 1 were formed. That is, 1 inch by 1 inch by ¼ inch 0.955 density polyethylene crosslinked plaques using 2,5-dimethyl-2,5-di(t-butylperoxy)hexyne-3 were formed. A portion of the sample was cut off, weighed and disposed in xylene, maintained at a temperature of 110° C., for 16 hours. At the end of that time, the xylene liquid was filtered and the solid portion weighed.

It was found that the solid polyethylene sample decreased in weight by 5% indicating that 5% of the original polyethylene was uncured (not crosslinked), in that xylene at 110° C. dissolves linear polyethylene but not crosslinked polyethylene.

COMPARATIVE EXAMPLE 5

One hundred parts by weight of the same 0.955 density linear polyethylene employed in Example 4 was blended with 0.7 part by weight of dicumyl peroxide in accordance with Example 1. In addition, the blended mass was formed into test specimens, again in accordance with the procedure of Example 1.

A portion of a specimens were weighed, dissolved in xylene, filtered and weighed again in accordance with the procedure of Example 4. It was found that the samples of this example were completely dissolved indicating that the polyethylene was totally uncrosslinked after blending with the dicumyl peroxide.

The above preferred embodiments and examples are given to illustrate the scope and spirit of the instant invention. These embodiments and examples will make apparent, to those skilled in the art, other embodiments and examples, these other embodiments and examples are within the contemplation of the present invention. Therefore, the present invention should be limited only by the appended claims.

What is claimed is:

1. A method for covering an electrical conducting means comprising covering an electrical conducting means with an ethylene polymer composition, said composition consisting essentially of a linear ethylene polymer, said polymer containing at least about 90% by weight of ethylene and having a desity of at least about 0.94, a crosslinking effective amount of an acetylenic diperoxide compound having a one hour half-life decomposition temperature of more than 135° C. and a monomeric crosslinking coagent.

2. A method in accordance with claim 1 wherein said acetylenic diperoxide compound is selected from the group consisting of hexynes having the formula

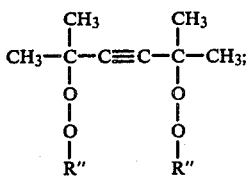

octyles having the formula

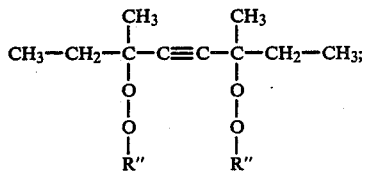

and octynes having the formula

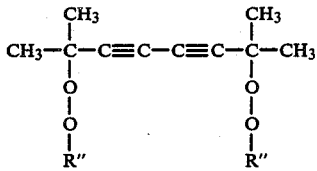

wherein R" is tertiary alkyl, alkyl carbonate or benzoate.

3. A method in accordance with claim 1 wherein said linear ethylene polymer is polyethylene.

4. A method in accordance with claim 1 wherein said linear ethylene polymer is a copolymer of ethylene and an alpha-olefin containing 3 to 8 carbon atoms, said ethylene present in said copolymer in a concentration of at least 90 percent by weight based on the total weight of the copolymer.

5. A method in accordance with claim 2 wherein said diperoxy compound is 2,5-dimethyl-2,5-di(t-butylperoxy)-hexyne-3.

6. A method in accordance with claim 1 wherein said composition includes an ultraviolet inhibitor.

7. A method in accordance with claim 6 where said ultraviolet inhibitor is carbon black.

8. A method in accordance with claim 1 wherein said monomeric crosslinking coagent is triallyl cyanurate.

9. A method in accordance with claim 1 wherein said composition includes a pigment or color additive.

10. A method in accordance with claim 1 wherein said composition includes a heat stabilizer.

11. A method in accordance with claim 1 wherein said composition includes a flame retardant compound.

12. A method in accordance with claim 11 wherein said flame retardant is an organic, heat-labile chlorine or bromine compound.

13. A method in accordance with claim 12 wherein said composition includes antimony trioxide.

14. A method for covering an electrical conducting means comprising covering an electrical conducting means with a polyethylene composition, said composition consisting essentially of polyethylene having the density of at least about 0.94, 2,5-dimethyl-2,5-di(t-butylperoxy)-hexyne-3 and triallyl cyanurate.

15. A method in accordance with claim 14 wherein said composition additionally consists essentially of carbon black.

16. A method in accordance with claim 14 wherein said composition additionally consists essentially of a pigment or color additive.

17. A method in accordance with claim 14 wherein said composition additionally consists essentially of a heat stabilizer.

18. A method in accordance with claim 14 wherein said composition additionally consists essentially of an organic, heat-labile chlorine or bromine compound.

19. A method in accordance with claim 18 wherein said composition additionally consists essentially of antimony trioxide.

* * * * *